(12) United States Patent
Garcia-Alvarado et al.

(10) Patent No.: US 8,996,505 B1
(45) Date of Patent: Mar. 31, 2015

(54) DATA MOVEMENT DRIVEN AUTOMATIC DATA PLACEMENT

(75) Inventors: Carlos Garcia-Alvarado, Houston, TX (US); Venkatesh Raghavan, Sunnyvale, CA (US); Sivaramakrishnan Narayanan, Bangalore (IN); Florian Waas, San Francisco, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 256 days.

(21) Appl. No.: 13/530,584

(22) Filed: Jun. 22, 2012

Related U.S. Application Data

(60) Provisional application No. 61/618,453, filed on Mar. 30, 2012.

(51) Int. Cl.
*G06F 7/00* (2006.01)
*G06F 17/30* (2006.01)

(52) U.S. Cl.
CPC .... *G06F 17/30442* (2013.01); *G06F 17/30463* (2013.01)
USPC ............................ 707/718; 707/694; 707/719

(58) Field of Classification Search
CPC .................... G06F 17/30442; G06F 17/30463
USPC .......................................... 707/694, 718, 719
See application file for complete search history.

(56) References Cited

U.S. PATENT DOCUMENTS

| | | | |
|---|---|---|---|
| 7,778,981 B2* | 8/2010 | Armitano et al. | 707/694 |
| 8,150,816 B2* | 4/2012 | Lim | 707/694 |
| 8,661,003 B2* | 2/2014 | Lim | 707/694 |
| 2005/0071331 A1* | 3/2005 | Gao et al. | 707/4 |
| 2011/0295907 A1* | 12/2011 | Hagenbuch et al. | 707/803 |
| 2012/0191677 A1* | 7/2012 | Lim | 707/694 |
| 2012/0284243 A1* | 11/2012 | Azagury et al. | 707/694 |

OTHER PUBLICATIONS

Rao et al., ACM SIGMOD Jun. 4-6, 2002, Madison, Wisconsin, USA, pp. 558-569.*
Garcia-Alvarado et al., 2012 IEEE 28th International Conference on Data Engineering Workshops, pp. 322-327.*

* cited by examiner

*Primary Examiner* — Cheyne D Ly
(74) *Attorney, Agent, or Firm* — Fish & Richardson P.C.

(57) ABSTRACT

Data movement driven placement of data in a distributed database is disclosed. A set of one or more queries anticipated to be performed with respect to a data set is received. A set of statistics associated with the data set is received. The set of queries and the statistics are used to explore algorithmically a search space of distribution policy alternatives, to determine an optimal distribution policy to distribute data comprising the data set across a plurality of database servers.

24 Claims, 5 Drawing Sheets

DATA MOVEMENT DRIVEN AUTOMATIC DATA PLACEMENT

CROSS REFERENCE TO OTHER APPLICATIONS

This application claims priority to U.S. Provisional Patent Application No. 61/618,453 entitled DATA MOVEMENT DRIVEN AUTOMATIC DATA PLACEMENT filed Mar. 30, 2012 which is incorporated herein by reference for all purposes.

BACKGROUND OF THE INVENTION

In order to scale to very large amounts of capacity (e.g., multiple petabytes), shared-nothing parallel data warehouses typically leverage large clusters of commodity servers with local, direct attached storage. The physical design for shared-nothing databases typically includes decisions regarding the placement of data across a cluster of database servers comprising a massively parallel processing system (MPP). In particular, for each table in the database typically a distribution policy must be specified. In general, the choice of distribution policy affects the performance of query workloads significantly as individual queries may have to redistribute data on-the-fly as part of the execution, for example to join tables whose data is not co-located. Excessively moving data between nodes can flood the network with data thereby reducing the effectiveness of the system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automated determination of a distribution policy, e.g., to distribute one or more database tables across multiple nodes, based at least in part on anticipated queries and the amount of data movement that would be expected to be required under one or more proposed distribution policies, is disclosed. In various embodiments, anticipated queries are received, for example queries that an enterprise or other user and/or owner of data anticipate may be performed many times daily. Starting with an initial distribution policy, for example a default policy, a current policy, a randomly determine policy, etc., proposed distributions are considered in successive iterations to determine an optimal policy based at least in part on the amount of data movement that would be required to perform anticipated queries under various distribution policies.

Figure 1:
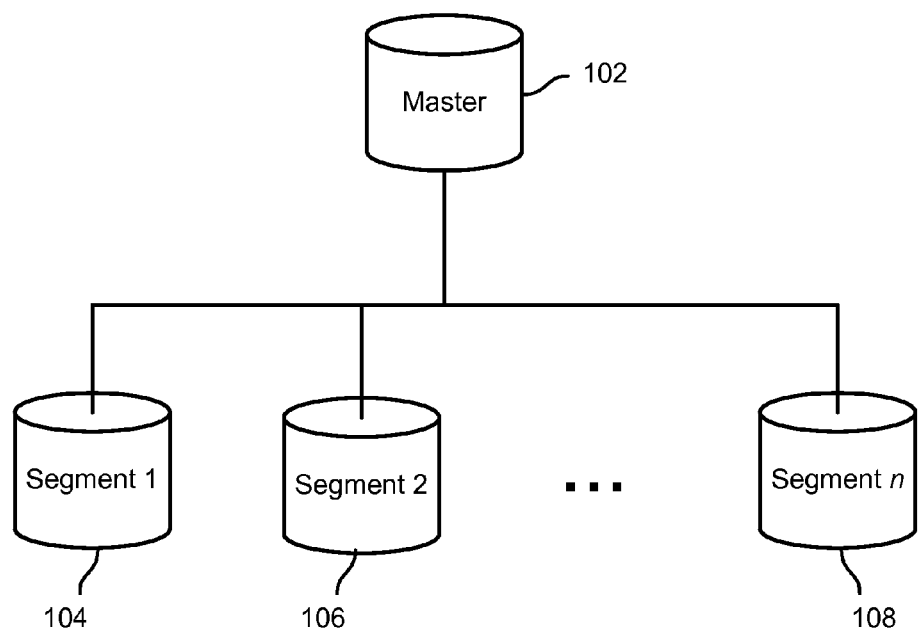
FIG. 1 is a block diagram illustrating an example of a shared-nothing massively parallel processing database system.

FIG. 1 is a block diagram illustrating an example of a shared-nothing massively parallel processing database system. In the example shown, a master database server 102 coordinates work by a plurality of segment servers 1 to n, represented in FIG. 1 by segment servers 104, 106, and 108, to distribute one or more database tables across a large number of storage nodes, not shown. Each segment server is assigned responsibility, via a distribution policy, for a designated portion of the table. As data records are stored, for example, each is processed by a corresponding segment server to which it is assigned under the current distribution policy. To perform a query, an optimizer (not shown) receives the query and provides as output a query plan. The plan typically includes or implies, for such a distributed database table, a requirement to move data between segment servers, for example to "join" or otherwise combine database table or portions thereof, to execute the query plan provided by the optimizer. For very large database tables spread potentially across a large number of segment servers, the amount of data movement may be substantial, and may comprise a very significant portion of the overall workload and associated cost of performing the query.

Figure 2:
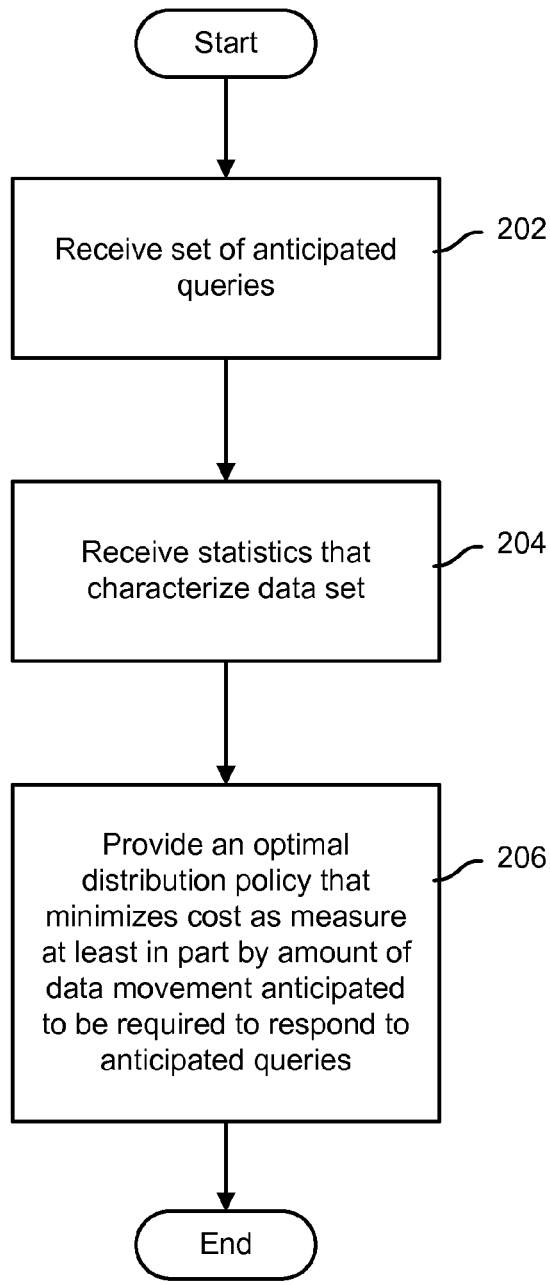
FIG. 2 is a flow diagram illustrating an embodiment of a process to provide a distribution policy.

FIG. 2 is a flow diagram illustrating an embodiment of a process to provide a distribution policy. In the example shown, a set of anticipated queries {Q} is received (202). Statistics for the data set with respect to which the set of anticipated queries are expected to be performed are received (204). Examples of such statistics include, without limitation, numbers of records corresponding to specific values and/or ranges of values for particular attributes. For example, for records that include a "State" attribute, an example statistic may be the number of records corresponding to each of the fifty states. An optimal distribution policy that minimizes cost, as measured at least in part by the amount of data movement that would be expected to be required to perform the anticipated queries {Q}, is determined and provided (206). In some embodiments, the optimal distribution policy is implemented at least in part automatically, for example by configuring the massively parallel processing (MPP) database system to implement the optimal distribution policy.

Figure 3:
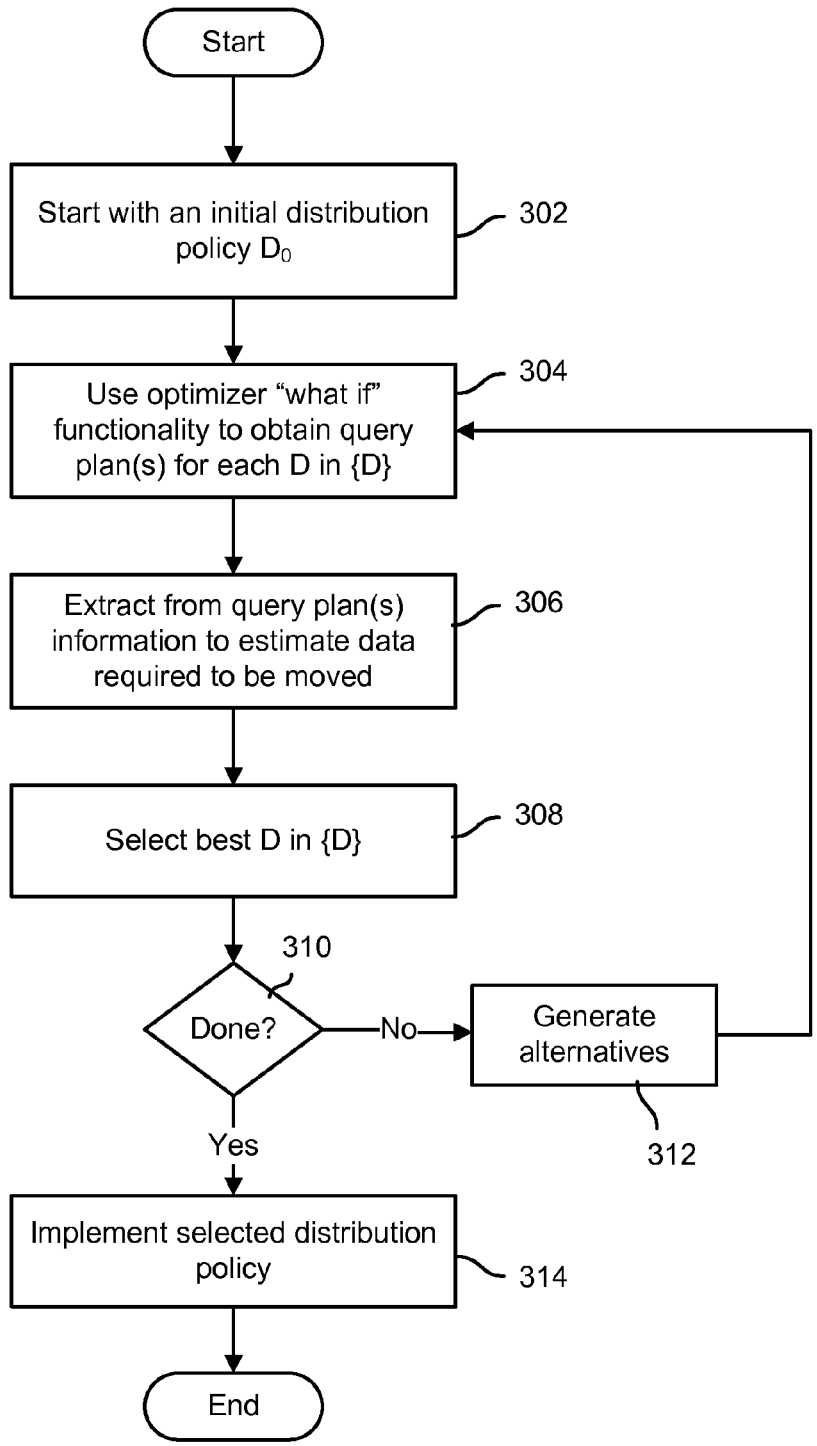
FIG. 3 is a flow diagram illustrating an embodiment of a process to determine an optimal distribution policy.

FIG. 3 is a flow diagram illustrating an embodiment of a process to determine an optimal distribution policy. In some embodiments, step 206 of FIG. 2 includes the process of FIG. 3. Starting with an initial distribution policy $D_0$ (302), for example a default policy, an already existing policy, a randomly determined policy, etc., a "what if" or other planning function of the database system optimizer is used to determine, without actually causing any data to be moved, the data movement and/or other costs that would be associated with performing the anticipated queries $\{Q\}$ under the distribution policy currently being evaluated (304), e.g., $D_0$ in the first iteration. For each query plan, an estimate of the amount of data that would be required to be moved to execute the plan is determined, for example, specified columns of specific tables, using for example previously received or otherwise determined statistics for the dataset (306). Based at least in part on the amount of data that would be required to be moved to execute the respective sets of query plans generate for the data distribution policy candidate(s) $\{D\}$ currently under consideration, a best-so-far distribution policy $D_{best}$ is determined (308). It is determined whether an (at least locally and/or sufficiently) optimal solution has been found (310). For example, in some embodiments it is determined whether any distribution policy alternative generated based on analysis of a previously-determined best distribution policy and/or in some embodiments alternatives best on second best, third best, etc. policies from the previous iteration, resulted in a more optimal expected distribution (i.e., no or insufficient cost savings as measured at least in part in terms of total amount of data anticipated to be required to be moved to perform anticipated queries $\{Q\}$). If not, further distribution policy alternatives to be explored and considered are generated (312). If the current iteration is determined to have identified an optimal solution (310), for example because none of the most recently considered candidates resulted in anticipated savings over the previously determined best, or in some embodiments after expiration of a prescribed amount of search time even if successive iterations continue to find marginally more optimal solutions, then the determined optimal distribution policy is implemented (314). In various embodiments, the determined policy may be implemented at least in part automatically. For example, an administrator may configure the system to configure the MPP database system to implement and execute on the selected distribution policy, and to begin to locate database data in accordance with the selected policy. In some embodiments, the selected policy may be presented to an administrator to be implemented under the administrator's control and direction, and/or at the administrator's discretion.

Figure 4:
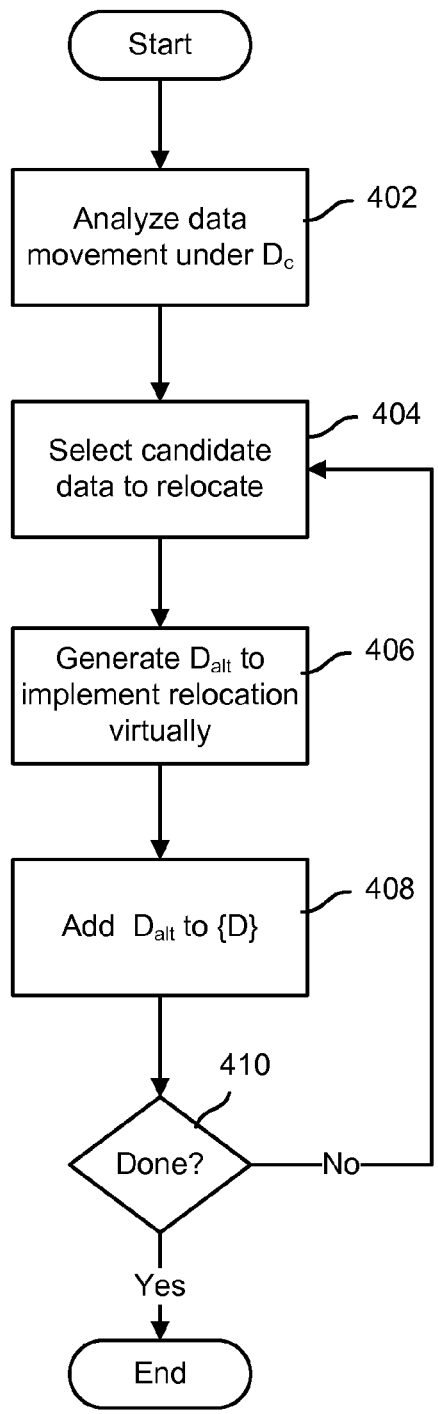
FIG. 4 is a flow diagram illustrating an embodiment of a process to generate alternative distribution policies.

FIG. 4 is a flow diagram illustrating an embodiment of a process to generate alternative distribution policies. In various embodiments, step 312 of FIG. 3 includes the process of FIG. 4. In the example shown, data movement determined to be expected to be required under a distribution policy candidate $D_c$ most recently considered is analyzed (402). For example, as described above, data movement determined to be required under query plans generated for anticipated queries $\{Q\}$ under distribution policy Dc is analyzed. Based on the analysis, data that could profitably be "relocated", effectively, by changing the distribution policy in some respect, for example in a way it is anticipated would result in that part of the data set ending up at a different segment or other one of the database servers, is identified (404) and alternative distribution policies $D_{alt}$ are generated (406) to effect (virtually) such relocation (i.e., which would be expected to cause the identified data to end up in the new location, if implemented, in light of the data set statistics). For example, if it can be seen that with data distributed under $D_c$ large amounts of data having a particular attribute value A must be moved from a first segment server $s_1$ to a second segment server $s_2$ to perform anticipated queries $\{Q\}$, then an alternative distribution policy $D_{alt}$ that would result in data having attribute A already being stored at segment server $s_2$ may be generated.

Alternative distribution policies in some embodiments are generated by analyzed the best n candidates considered in the previous iteration, for example of the process of FIG. 3. In some embodiments, it may be considered desirable to generate alternatives based on candidate distribution policies that were not determined to be the very "best" of the candidates considered previously, in terms for example of having the lowest data movement and/or other cost, since variants of second or even third or fourth best candidates from the prior set might yield a distribution policy candidate that would have a lower overall cost than the previously determined best candidate and/or variants only of the previously determined best.

The generated alternative distribution policies to be evaluated are added to the candidate set $\{D\}$ (408). It is determined whether any further candidate distribution policies are to be generated and added to $\{D\}$ (410). If not the process ends and candidates in $\{D\}$ are evaluated, as described above, otherwise further iterations of 404, 406, 408, and 410 are performed until all alternative distribution policy candidates have been generated and added to the candidate set $\{D\}$.

In some embodiments it may be determined, for example in the course of analyzing candidate distribution policies and generating further candidates, that some data in the set may be required to be moved between nodes under different candidate distribution policies Dc, despite attempts to cause the data to be located to minimize the need for such movement. In such cases, in some embodiments a determination may be made, programmatically, that such data should be replicated to one or more nodes in addition to the primary location to which it is distributed. In some embodiments, such replication may be built into a candidate distribution policy, to enable it to be determined whether under a candidate distribution policy Dc that includes such replication or in conjunction with which such replication is simulated the data movement cost associated with performing anticipated queries $\{Q\}$ may be minimized.

Figure 5:
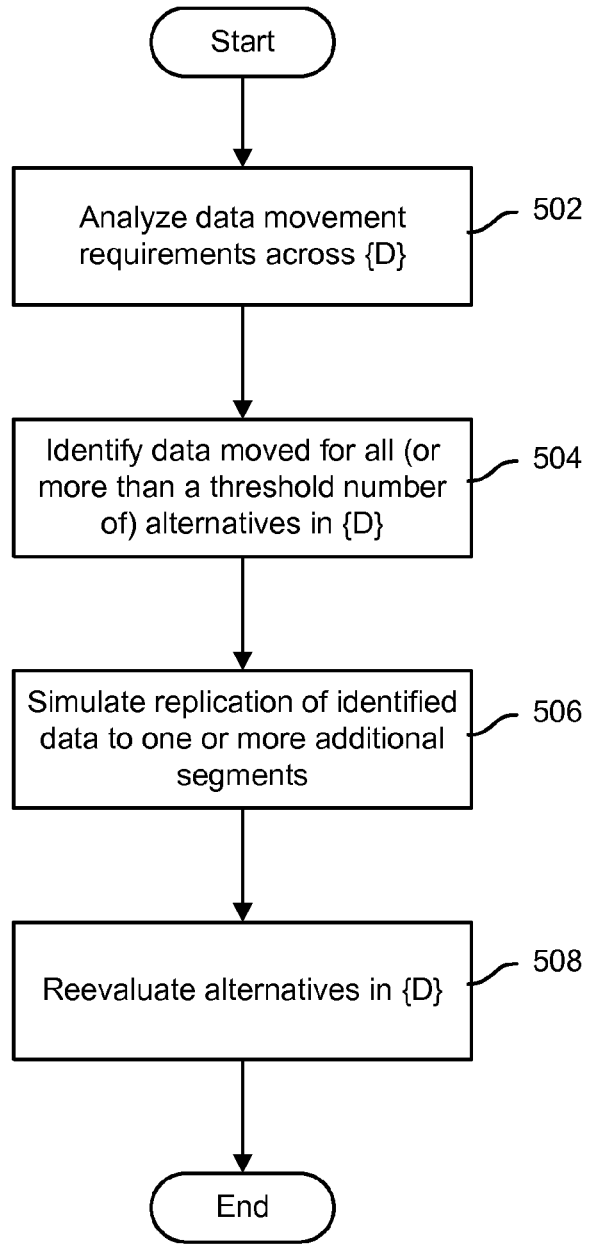
FIG. 5 is a flow diagram illustrating an embodiment of a process to identify replication candidates.

FIG. 5 is a flow diagram illustrating an embodiment of a process to identify replication candidates. In the example shown, data movement expected to be required to perform anticipated queries $\{Q\}$ is analyzed across candidate distribution policies $D_c$ in a current set of distribution policy candidates $\{D\}$ (502). Subsets of data that appear to be required to be moved, one way or another, regardless of the distribution policy D that is simulated, are identified (504). In some embodiments, data required to be moved under at least a threshold number of candidates in $\{D\}$ are identified. Conditions under which some or all of the data identified in step 504 have been replicated to one or more additional segment or other database servers, to obviate the need to move such data to perform one or more of the anticipated queries $\{Q\}$, are simulated (506); and one or more candidate distributions policies in $\{D\}$ are reevaluated under such conditions to determine whether the cost (e.g., data movement cost) associated with the policy as combined with such replication is lower than the previously determined "best" policy without (or with) replication (508). In some embodiments, the cost of replication (processing power, data movement at replication time, other overhead) are considered in evaluating a distribution policy under conditions in which replication is simulated.

In various embodiments, techniques described herein may be used to determine at least in part automatically a distribution plan, for any MPP database capable of providing query plans for anticipated queries in response to "what if" scenarios, i.e., under a hypothetical distribution associated with an alternative but not necessarily (as of yet) implemented distribution policy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing a database, comprising:
receiving a set of one or more queries on a data set;
receiving a set of statistics associated with the data set; and
determining an optimal distribution policy to distribute data comprising the data set across a plurality of database servers, the determining comprising, after determining an initial candidate distribution policy, performing iterations, each iteration comprising:
obtaining a policy set including one or more candidate distribution policies, the policy set initially including the initial candidate distribution policy;
obtaining, from a query optimizer, a respective query plan of the set of one or more queries for each candidate distribution policy in the policy set by feeding the set of one or more queries to the query optimizer as inputs under the each candidate distribution policy;
estimating, using each query plan and the set of statistics, a respective cost associated with each candidate distribution policy in the policy set, the cost representing a respective amount of estimated data movement under the query plan associated with the each candidate distribution policy;
upon determining that a termination condition is satisfied, designating a candidate query plan in the policy set that is associated with a lowest cost as the optimal distribution policy and terminating the iterations; and
upon determining that the termination condition is not satisfied, generating a distribution policy alternative based on a candidate distribution policy in the policy set and an amount of estimated data movement under that candidate distribution policy, adding the distribution policy alternative to the policy set as a new candidate distribution policy, and continuing the iterations.

2. The method of claim 1, wherein the statistics comprise at least one of numbers of records corresponding to specific values in the data set or ranges of values for particular attributes.

3. The method of claim 1, wherein determining that the termination condition is satisfied comprises determining that cost savings, as measured at least in part in terms of reduction of amount of data movements between iterations, are insufficient.

4. The method of claim 1, wherein generating the distribution policy alternative comprises:
selecting candidate data to relocate to reduce the estimated data movement;
changing an aspect of the candidate distribution policy to virtually relocate the candidate data; and
designating the changed candidate distribution policy as the distribution policy alternative.

5. The method of claim 1, wherein generating the distribution policy alternative comprises:
determining a currently best n candidate distribution policies; and
deriving the distribution policy alternative based on each candidate included in the currently best n distribution policy candidates.

6. The method of claim 1, wherein generating the distribution policy alternative includes determining a currently best distribution policy candidate and deriving the distribution policy alternative at least in part by analyzing data movement that is anticipated as would be required to perform the one or more queries under the currently best distribution policy.

7. The method of claim 6, wherein the distribution policy alternative is derived at least in part by changing an element of the currently best distribution policy to reduce the data movement.

8. The method of claim 1, wherein generating the distribution policy alternative comprises:
selecting candidate data to relocate to reduce the estimated data movement;
changing an aspect of the candidate distribution policy to virtually relocate the candidate data; and
designating the changed candidate distribution policy as the distribution policy alternative.

9. The method of claim 1, wherein each iteration includes identifying a subset of the data set to be replicated to a replication destination database server in addition to a primary database server to which the data in the subset is anticipated to be distributed under a candidate distribution policy.

10. The method of claim 1, wherein the optimal distribution policy is determined to be a current best distribution policy after successive iterations lasted a prescribed period of time.

11. The method of claim 1, further comprising configuring the database to implement the optimal distribution policy.

12. A database management system, comprising:
a plurality of database servers;
a memory configured to store a set of one or more queries on a data set, and a set of statistics associated with the data set; and
one or more processors coupled to the memory and configured to perform operations of determining an optimal distribution policy to distribute data comprising the data set across the database servers, the operations comprising, after determining an initial candidate distribution policy, performing iterations, each iteration comprising:
obtaining a policy set including one or more candidate distribution policies, the policy set initially including the initial candidate distribution policy;
obtaining, from a query optimizer, a respective query plan of the set of one or more queries for each candidate distribution policy in the policy set by feeding the set of one or more queries to the query optimizer as inputs under the each candidate distribution policy;
estimating, using each query plan and the set of statistics, a respective cost associated with each candidate distribution policy in the policy set, the cost representing a respective amount of estimated data movement under the query plan associated with the each candidate distribution policy;
upon determining that a termination condition is satisfied, designating a candidate query plan in the policy set that is associated with a lowest cost as the optimal distribution policy and terminating the iterations; and
upon determining that the termination condition is not satisfied, generating a distribution policy alternative based on a candidate distribution policy in the policy set and an amount of estimated data movement under that candidate distribution policy, adding the distribution policy alternative to the policy set as a new candidate distribution policy, and continuing the iterations.

13. The system of claim 12, wherein the database servers comprise a massively parallel processing (MPP) database system, and the database servers comprise segment servers of the MPP database system.

14. The system of claim 12, wherein the query optimizer applies a "what if" function to derive the query plans.

15. The system of claim 12, wherein the initial candidate distribution policy comprises one or more of a currently configured distribution policy, a randomly determined distribution policy, or a default distribution policy.

16. The system of claim 12, wherein the statistics comprise at least one of numbers of records corresponding to specific values in the data set or ranges of values for particular attributes.

17. The system of claim 12, wherein estimating the cost includes determining a data movement cost associated with moving one or more columns of one or more tables to perform the one or more queries.

18. The system of claim 17, wherein estimating the cost is determined without actually moving the one or more columns.

19. The system of claim 17, wherein the data movement cost is determined at least in part by invoking a "what if" interface of the query optimizer or another query plan generator.

20. The system of claim 12, wherein generating the distribution policy alternative comprises:
  selecting candidate data to relocate to reduce the estimated data movement;
  changing an aspect of the candidate distribution policy to virtually relocate the candidate data; and
  designating the changed candidate distribution policy as the distribution policy alternative.

21. The system of claim 12, wherein determining that the termination condition is satisfied comprises determining that cost savings, as measured at least in part in terms of reduction of amount of data movements between iterations, are insufficient.

22. The system of claim 12, wherein generating the distribution policy alternative includes determining a currently best distribution policy candidate and deriving the distribution policy alternative at least in part by analyzing data movement that would be required to perform the one or more queries under the currently best distribution policy.

23. The system of claim 12, wherein statistics comprise at least one of numbers of records corresponding to specific values in the data set or ranges of values for particular attributes.

24. A non-transitory, tangible computer readable storage medium storing a computer program product to manage a database system, the computer program product comprising computer instructions that, when executed, cause the database system to perform operations comprising:
  receiving a set of one or more queries on a data set;
  receiving a set of statistics associated with the data set; and
  determining an optimal distribution policy to distribute data comprising the data set across a plurality of database servers, the determining comprising, after determining an initial candidate distribution policy, performing iterations, each iteration comprising:
    obtaining a policy set including one or more candidate distribution policies, the policy set initially including the initial candidate distribution policy;
    obtaining, from a query optimizer, a respective query plan of the set of one or more queries for each candidate distribution policy in the policy set by feeding the set of one or more queries to the query optimizer as inputs under the each candidate distribution policy;
    estimating, using each query plan and the set of statistics, a respective cost associated with each candidate distribution policy in the policy set, the cost representing a respective amount of estimated data movement under the query plan associated with the each candidate distribution policy;
  upon determining that a termination condition is satisfied, designating a candidate query plan in the policy set that is associated with a lowest cost as the optimal distribution policy and terminating the iterations; and
  upon determining that the termination condition is not satisfied, generating a distribution policy alternative based on a candidate distribution policy in the policy set and an amount of estimated data movement under that candidate distribution policy, adding the distribution policy alternative to the policy set as a new candidate distribution policy, and continuing the iterations.

* * * * *